Patented Apr. 1, 1924.

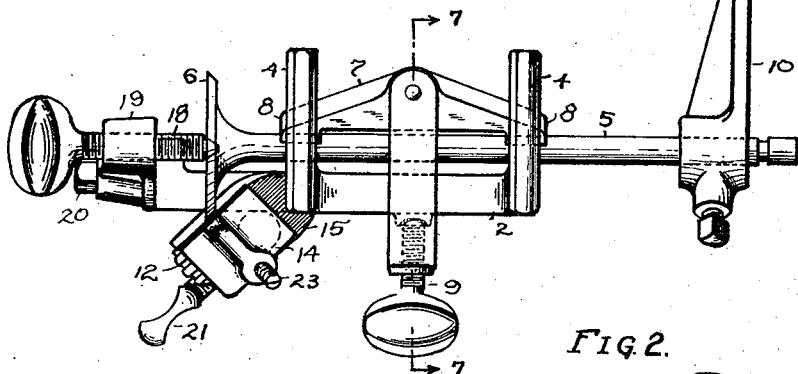
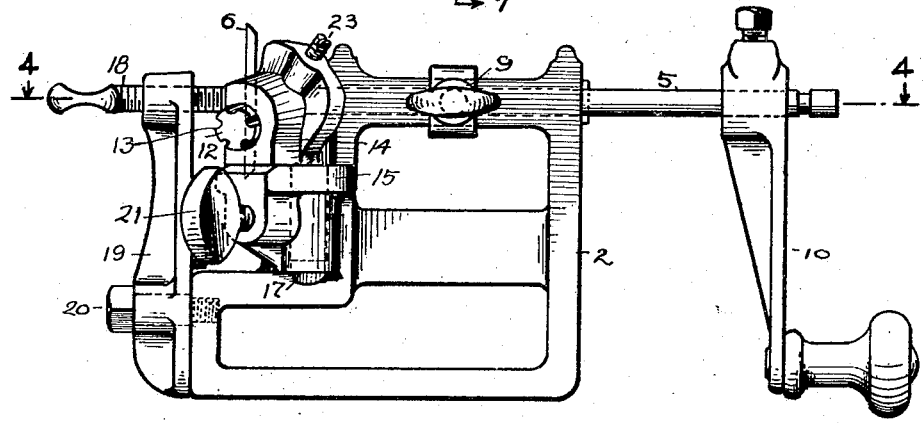
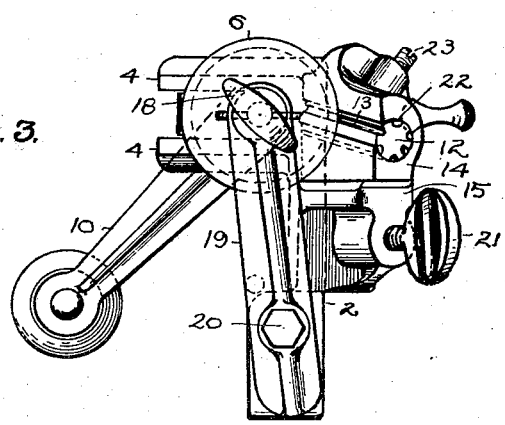

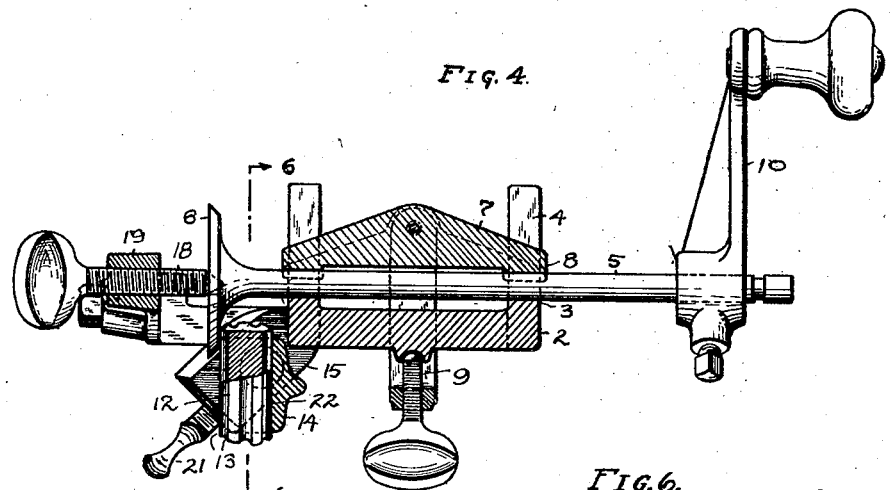
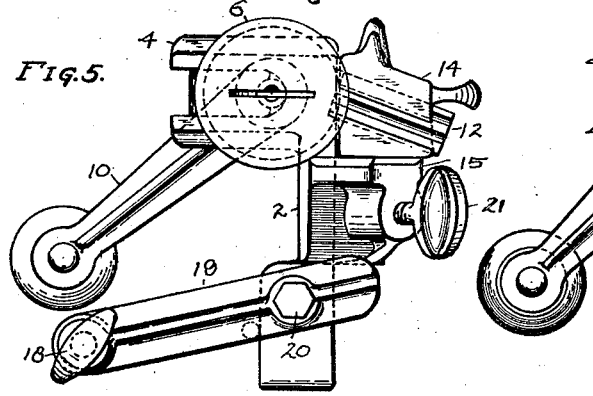
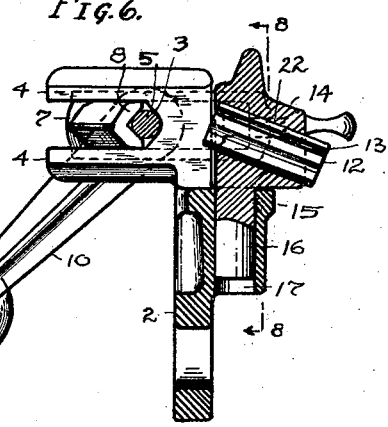
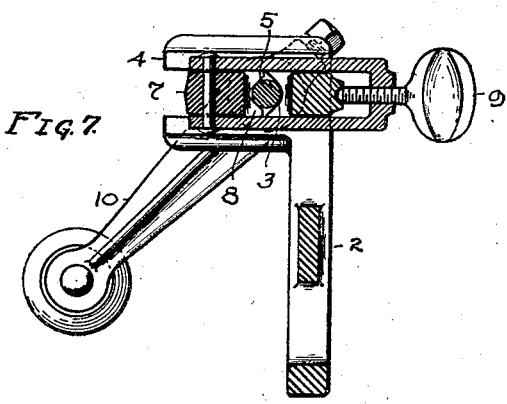
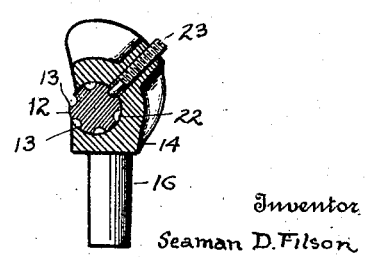

1,488,486

UNITED STATES PATENT OFFICE.

SEAMAN D. FILSON, OF CLEVELAND, OHIO.

APPLIANCE FOR BEVELING AND FACING ENGINE VALVES.

Application filed December 30, 1920. Serial No. 433,983.

*To all whom it may concern:*

Be it known that I, SEAMAN D. FILSON, a citizen of the United States, residing at Cleveland, in the county of Cuyahoga and State of Ohio, have invented certain new and useful Improvements in an Appliance for Beveling and Facing Engine Valves, of which the following is a specification.

My invention consists of a simple appliance for refacing engine valves, and the appliance is especially designed and constructed to bevel and face disk valves having round supporting stems, using a cylindrical cutter mounted at a predetermined shearing angle and adjustable to different beveling angles and also adjustable rotatably about its own axis and longitudinally on the line of the shearing cut.

In the drawing accompanying this application, Fig. 1 is a plan view of my cutting appliance with a valve clamped in a rotatable position therein, while Fig. 2 is a side elevation and Fig. 3 an end view thereof. Fig. 4 is a horizontal section of the appliance showing the cutter facing the bottom side of the valve; Fig. 5 is a front end view of the appliance with the feed-screw arm turned down, and Fig. 6 is a vertical cross section on line 6—6, of Fig. 4. Fig. 7 is a vertical section of the holder and cutter, and Fig. 8 is a vertical cross section on line 8—8, of Fig. 4, showing the clamping yoke for the valve stem.

The appliance comprises a frame 2 of cast-metal having a pair of centering bearings 3 at the base of slotted arms 4 within which the round stem 5 of a valve 6 may be seated and rotated. A clamping yoke 7, having V-shaped extremities 8 adapted to engage stem 5, is supported for lateral movement between the slotted arms, and a thumb-screw 9 projects through the yoke in thrust engagement with one side of frame 2 to permit any desired clamping friction to be applied to the valve stem which is provided with a detachable crank 10 wherewith to rotate the same in cutting operations.

In general, the disk valves used in internal combustion engines have a beveled or chamfered face within the limits of a forty-five degree angle and a sixty degree angle and in some instances the bottom side is also squared or faced at an angle, and practically all of these valves have round stems and centering cavities. When a valve of this type is clamped within frame 2 it is adapted to be engaged and operated upon by a cylindrical cutter 12 secured within a holder 14 which is adapted to rest upon an offset 15 of frame 2, and this holder has a pivot post 16 extending into a socket 17. However, in cutting operations the holder and cutter are held stationary by set screws, and the valve only is rotated by crank 10. The valve may also be fed or pressed against the cutter by a feed screw 18 carried at the upper end of an arm 19 which is clamped to the front end of frame 2 by a pivot bolt 20. This arm and feed screw may be turned laterally on pivot bolt 20 as shown in Fig. 5 to permit the valve to be inserted or removed from the front end of the appliance. A set screw 21 serves to lock holder 14 in socket 16 and in any adjusted position when turned.

Holder 14 has a round head with a round transverse bore 22 which is open at both ends and one side, and this bore is inclined sufficiently to place it at a tangent to the curved edge of the disk when the stem is clamped in bearings 3. In this way the sides of the cutter will produce a shearing cut at the edge or bottom of the valve disk, and the round bore 22 permits the use of a round cylindrical cutter 12 having a series of longitudinal cutting edges 13, anyone of which may be placed in the gap or open space at one side of the holder. An accurate rotary setting of the cutting edge may be effected by projecting the reduced inner end of a set screw 23 into one of the clearance channels in the cutter, and by retiring said set screw the cutter may be rotated in the bore to expose a different cutting edge. The cutter may also be moved longitudinally within the bore to present different cutting portions of the same cutting edge to the disk, and the ends of the cutter may be projected beyond the holder and brought nearer to or farther away from the axis of the valve to reface valves of different sizes, that is, disks of different diameters. Thus, a small disk will be engaged by the cutter at a point relatively near the pivot post and a large disk at a point more remote, due to the angle of inclination of the straight cutting edge relatively to the axis of the valve.

The holder is preferably placed as close as possible to the first bearing or seat for the valve stem to permit the stem to be clamped where it is perfertly round and not worn, it being understood that the wear on such stems usually takes place at a point somewhat remote from the head or disk and that this worn portion of the stem may not be concentric with the disk. Rotation of the stem is anti-clockwise or to the left which favors the cutting action and causes the holder to be seated without chatter on its rest, and to make the operation and handling of the parts convenient and accessible the several screws for clamping, setting and feeding, including the holder, are all located at the front side of the frame nearest to the operator.

What I claim is:

1. An appliance for beveling and facing disk valves, comprising holding means for the valve adapting said valve to be rotated, a cylindrical cutter having a straight longitudinal cutting edge, and a holder for said cutter adapted to be turned to place the sides of said cutter in different angular cutting positions relatively to the plane of rotation of the disks.

2. A beveling appliance for disk valves having stems, comprising a clamp adapted to grip the valve stem, a pivoted holder having a transverse bore, and a cylindrical cutter rotatably seated within said bore having a multiple number of straight longitudinal cutting edges adapted to be exposed successively at one side of said holder.

3. A disk valve refacing appliance, comprising a support for the valve, means adapted to rotate said valve upon said support, a holder pivoted at one side of the axis of rotation of said valve, a cylindrical cutter having straight parallel cutting edges mounted upon said holder, and means adapted to feed the valve towards said cutter.

4. A beveling and facing appliance, comprising valve clamping members, a pivoted holder for a cutter, and a cylindrical cutter having straight parallel cutting edges rotatably mounted within said holder on an axis tangential to the curved edge of said valve.

5. An appliance for beveling and facing disk valves, comprising a clamp, a holder having a vertical pivot post and a transverse bore, a cylindrical cutter rotatably seated within said bore having straight longitudinal channels and cutting edges, and a set screw for said cutter adapted to extend into said channels.

6. An appliance for beveling and facing disk valves, comprising a clamping yoke for the valve, a rotatable holder having a horizontally-inclined bore open at one side thereof, a straight-edged channeled cutter removably seated within said bore, a set screw adapted to fix said cutter in different rotatable positions, and a feed screw adapted to engage the end of the valve.

7. A refacing appliance for used valves, having aligned bearings adapted to seat a valve stem, a cutter holder pivotally mounted closely adjacent one of said bearings, a cylindrical straight-edged cutter removably seated within said holder, means adapted to fix said cutter in different positions rotatably and longitudinally within said holder, and a pivoted arm opposite said holder having a feed screw adapted to engage one end of the valve.

8. A frame and clamping yoke having centering bearings adapted to hold the stem of a disk valve, an arm at one end of said frame having a screw member adapted to engage said valve centrally at one end thereof, a holder having a pivot post mounted within said frame at one side of the axis of the valve stem, a set screw adapted to fix said holder in different angular positions, a cylindrical straight-edged cutter rotatably mounted within said holder, a set screw adapted to engage said cutter and fix its working position within said holder, and a crank handle adapted to be detachably engaged with the valve stem to rotate the same for cutting operations.

9. An appliance for refacing disk valves having stems, comprising a metal frame having slotted arms with centering bearings adapted to seat the valve stem, a clamping yoke having centering bearings adapted to frictionally engage the valve stem, a pivoted arm at one end of said frame having a feed screw adapted to engage the head end of the valve when clamped within said bearings, an offset on said frame having a pivot opening adjacent one of said bearings, a holder having a pivoted post seated within said offset opening and provided with a horizontally-inclined bore open at one side and at its ends, a cylindrical cutter adjustably mounted within said bore having a multiple number of longitudinal straight cutting edges adapted to be exposed at the open side of said bore, a set screw adapted to lock said cutter within the holder, and means adapted to lock said holder and cutter in different angular working positions relatively to the axis of the valve.

Signed at Cleveland, in the county of Cuyahoga, and State of Ohio, this 23rd day of October, 1920.

SEAMAN D. FILSON.